United States Patent [19]

Abe et al.

[11] Patent Number: 5,286,460
[45] Date of Patent: * Feb. 15, 1994

[54] METHOD OF OPERATING CATALYTIC CONVERTER

[75] Inventors: Fumio Abe, Handa; Takashi Harada, Nagoya; Hiroshige Mizuno, Tajimi, all of Japan

[73] Assignee: NGK Insulators, Ltd., Japan

[*] Notice: The portion of the term of this patent subsequent to Apr. 20, 2010 has been disclaimed.

[21] Appl. No.: 965,013

[22] Filed: Oct. 23, 1992

Related U.S. Application Data

[63] Continuation of Ser. No. 581,984, Sep. 14, 1990, Pat. No. 5,204,066.

[30] Foreign Application Priority Data

Jul. 4, 1990 [JP] Japan .................................. 2-176943

[51] Int. Cl.$^5$ .......................... F01N 3/10; B01D 53/36; H05B 3/10
[52] U.S. Cl. .................... 422/174; 422/173; 422/177; 60/299; 60/300
[58] Field of Search ................... 60/299, 300; 422/173, 422/174, 177, 180

[56] References Cited

U.S. PATENT DOCUMENTS

| | | | |
|---|---|---|---|
| 3,662,540 | 7/1972 | Murphey | 60/299 X |
| 3,768,982 | 10/1973 | Kitzner et al. | 60/300 X |
| 3,770,389 | 10/1973 | Kitzner et al. | 60/300 X |
| 3,832,443 | 8/1974 | Hass | 422/177 X |
| 3,947,545 | 3/1976 | Ishida et al. | 422/177 X |
| 3,956,614 | 5/1976 | Hervert | 219/541 |
| 4,976,929 | 12/1990 | Cornelison et al. | 422/174 |
| 5,063,029 | 11/1991 | Mizuno et al. | 422/174 X |

FOREIGN PATENT DOCUMENTS

| | | |
|---|---|---|
| 194507 | 9/1986 | European Pat. Off. . |
| 0355489 | 2/1990 | European Pat. Off. . |
| 1188373 | 1/1962 | Fed. Rep. of Germany . |
| 2333092 | 1/1975 | Fed. Rep. of Germany . |
| 63-67609 | 5/1988 | Japan . |
| 161599 | 5/1988 | Japan . |
| 2049377 | 12/1980 | United Kingdom . |
| WO89/10471 | 11/1989 | World Int. Prop. O. . |

OTHER PUBLICATIONS

"Recent Developments in Electrically Heated Metal Monoliths," Whittenberger et al., No. 900503, pp. 61–70.

Evaluation of Three-Way Catalysts-Part III Formation of $NH_3$, *Its Suppression by $SO_2$ and Re-Oxidation*, H. S. Gandhi, H. C. Yao, H. K. Stepien and M. Shelef, Ford Motor Company, pp. 107–118.

*Primary Examiner*—Robert J. Warden
*Assistant Examiner*—Christopher Y. Kim
*Attorney, Agent, or Firm*—Parkhurst, Wendel & Rossi

[57] ABSTRACT

In a catalytic converter operating method according to the present invention, a heater is energized at a predetermined power level or above and thereby heated substantially concurrently with the operation of an engine. During the heating, an oxidizing gas is introduced into the catalytic converter. When the temperature of the heater exceeds a value at which a main catalyst of the catalytic converter or a light-off catalyst carried on the heater functions, the power level is reduced by an output adjuster and supply of the oxidizing gas is suspended.

3 Claims, 1 Drawing Sheet

F I G.1
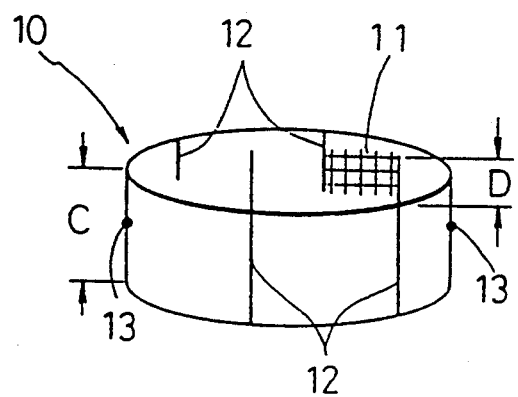

METHOD OF OPERATING CATALYTIC CONVERTER

This is a continuation of application Ser. No. 07/581,984 filed Sep. 14, 1990, now U.S. Pat. No. 5,204,066 now allowed.

BACKGROUND OF THE INVENTION

1. Field of the Invention

The present invention relates to a method of operating a catalytic converter which incorporates a heater. More specifically, the present invention pertains to a method of operating a catalytic converter in which the temperature of a heater is raised quickly at the initial stage of the operation of an engine to activate the catalyst and thereby achieve an increase in the exhaust gas conversion and in which the level of power is reduced after the desired temperature has been reached.

2. Description of the Related Art

Catalytic converters for use in controlling automotive exhaust gas have a minimum temperature that allows its catalyst function properly. Hence, the catalyst must be heated when the temperature thereof is not sufficiently high, i.e., at the beginning of running of a vehicle.

An example of such a catalytic converter has been introduced in SAE Paper 900503. This catalytic converter has a size of 480 cc, and includes a heater with a catalyst carried thereon. When the heater is energized by power of 3 KW while oxygen is being supplied thereto, the energization of which is started before the operation of the engine is started, the exhaust gas conversion at the beginning of the operation of the engine of a vehicle can be increased.

However, in the above-described catalytic converter operating method, it takes sixty seconds for the heater to be heated to 350° C. despite of the large power consumption due to the relatively large foil type heater. This results in a reduced exhaust gas conversion. Furthermore, it is difficult in a practical operation to energize the heater before the engine is operated. Also, the above literature does not refer to the amount of exhaust gas which can be controlled by the above catalytic converter, the temperature at which the catalyst functions, or the energization method. Furthermore, telescope phenomenon, inherent to the foil type heater, readily occurs in this heater, easily causing faulty operation thereof.

SUMMARY OF THE INVENTION

Accordingly, an object of the present invention is to provide a method of operating a catalytic converter in which the temperature of a heater is raised quickly at the initial stage of the operation of an engine to activate the catalyst and thereby achieve increase in the exhaust gas conversion.

To this end, the present invention provides a method of operating a catalytic converter with a heater incorporated therein, which comprises the steps of heating the heater by energizing it at a power level of 1.5 KW or above per unit amount $m^3$ of exhaust gas substantially concurrently with the operation of an engine while introducing an oxidizing gas into the catalytic converter, and reducing the power level by an output adjuster and suspending supply of the oxidizing gas when the temperature of the heater reaches a value at which a main catalyst of the catalytic converter or an light-off catalyst (catalyst for ignition) carried on the heater starts functioning.

Preferably, the heater employed in the present invention has a resistance adjusting means and is energized by a current density of 5 $A/mm^2$ or above.

The preferred temperature of the heater at which the power level is reduced is 300° C. or above.

BRIEF DESCRIPTION OF THE DRAWINGS

FIG. 1 is a perspective view of an example of a catalytic converter with a heater incorporated therein.

DETAILED DESCRIPTION OF THE INVENTION

In the catalytic converter operating method according to the present invention, the heater is energized at a predetermined power level or above and thereby heated substantially concurrently with the operation of an engine. During the heating, an oxidizing gas is introduced into the catalytic converter. When the temperature of the heater exceeds a value at which a main catalyst of the catalytic converter or a light-off catalyst carried on the heater functions, the power level is reduced by an output adjuster and supply of the oxidizing gas is suspended.

Thus, since the low-temperature exhaust gas can be quickly heated to a temperature at which the catalyst starts functioning or above at the initial stage of the operation of an engine when the emissions of a vehicle are maximum, increase in the exhaust gas conversion can be achieved. Furthermore, since the power level is reduced immediately after the desired temperature is reached, i.e., immediately after the catalyst is ignited, an efficient operation of the catalytic converter is possible.

In the present invention, the heater is energized at a power level of 1.5 KW or above, more preferably, at 3 KW or above, per unit $1m^3$ of exhaust gas and thereby heated substantially concurrently with the operation of the engine. In the case of the energization at a power level of 1.5 KW or above, the heater is heated to about 400° C. within ten seconds. In the case of energization at 3 KW or above, 400° C. is attained in five seconds. In both cases, since the quantity of exhaust gas varies at the beginning of the operation of the engine, an average quantity of exhaust gas emitted when the temperature thereof is below 300° C. is used.

Energization of the heater substantially concurrently with the operation of the engine may mean either energization of the heater concurrently with the operation of the engine or energization about several seconds, e.g., five seconds, before the engine starts.

To energize the heater at the initial stage of the operation of the engine, a battery of 24 V is used. At that time, the battery is preferably used together with a capacitor to obtain a temporary large current.

Since the exhaust gas at the beginning of the operation of the engine is rich (reducing atmosphere), introduction of the oxidizing gas is necessary for the conversion of CO and HC into $CO_2$ and water. Examples of suitable oxidizing gas include air, oxygen and ozone. From the practical point of view, however, introduction of air is simple and thus preferred. When the oxidizing gas is introduced, the amount of oxidizing gas is controlled in accordance with the engine speed by a mass flow sensor. In a practical operation, the amount of, for example, secondary air introduced is controlled such that the oxidation-reduction index given by the following expression will be held between 0.7 and 1.1, more preferably, between 0.8 and 1.0.

$$\text{Oxidation-reduction index} = \frac{\text{Oxidizing gas}}{\text{Reducing gas}} = \frac{(O_2 + 1/2NO)}{(2/3CO + 3/2HC)}$$

Oxidizing gas is introduced only when the oxidation-reduction index is outside of the aforementioned range. Preferably, introduction of the oxidizing gas is suspended in sixty seconds or below.

The heater is heated generally to a temperature at which the main catalyst of the catalytic converter or the light-off catalyst carried on the heater is activated or above, i.e., 300° C. or above.

When the temperature of the heater exceeds the value at which the catalyst is activated, the power level is reduced by an output adjuster. In a practical operation, reduction in the power level is achieved by performing on-off control of the battery of 24 V or 12 V (by reducing the power level per unit time) or by performing inverter control. Although the time when the operation of reducing the power level begins varies depending on the level of power supplied, as stated above, since the temperature of the heater reaches 400° C. within five or ten seconds, reduction in the power level is conducted five or ten seconds later from the energization of the heater.

Energization of the heater is suspended generally in sixty seconds or less.

The preferred heater employed in the present invention is one having a resistance adjusting means. Such a heater is energized at a preferred current density of 5 A/mm² or above. Energization of the heater at a current density of 5 A/mm² or above increases the rate at which the temperature of the heater rises, and thus allows the temperature of the heater to reach 300° C. or above within ten seconds. This in turn enables the main catalyst or the light-off catalyst carried on the heater to be activated effectively. More preferably, the heater is energized at a current density of 8 A/mm² or above. However, with too high a current density, a large amount of power is required and the catalyst on the heater is heated too high. From the viewpoint of durability of the catalyst, energization at no more than 30 A/mm² is therefore preferred.

It is desirable for the basic body of the heater to be comprised of a honeycomb structure. Whereas any material, ceramic or metal, capable of generating heat when energized, can be used as the material of the honeycomb structure, the use of metal enhances the mechanical strength of the resultant honeycomb structure and is thus preferred. The honeycomb structure may be porous or non-porous. In the case where a catalyst is carried on the honeycomb structure, however, a porous structure is preferred because it provides strong adhesion of a catalyst is layer, and the catalyst is substantially free from peeling from the structure even when a difference in the thermal expansion between the honeycomb structure and the catalyst exists.

The heater has a resistance adjusting mechanism of a desired form formed between the electrodes thereof, which will be described later.

The resistance adjusting mechanism formed on the honeycomb structure may take on any of the following forms:

(1) a slit or slits of any length, formed in any direction at any position,
(2) variations in the length of the cell walls in the axial direction of the passages,
(3) variations in the thickness (wall thickness) of the cell walls of the honeycomb structure or variations in the cell density of the honeycomb structure, or
(4) a slit or slits formed in the cell wall (rib) of the honeycomb structure.

Preferably, the heater comprising a honeycomb structure has electrodes on the outer peripheral portion of or inside thereof. The electrodes are attached to the honeycomb structure by welding or brazing.

The heater is constructed such that the resistance thereof will be preferably held between 0.001 Ω and 0.5 Ω.

FIG. 1 shows the concept of a heater arranged in the manner described above.

Preferably, a catalyst is placed on the surface of the honeycomb structure so as to allow heat to be generated due to reaction (oxidation) of the exhaust gas.

The catalyst supported on the surface of the honeycomb structure is made of a carrier having a high surface area and a catalyst activating material supported on the carrier. Typical examples of the carriers having a high surface area include $\gamma\text{-Al}_2O_3$, $TiO_2$, $SiO_2\text{-Al}_2O_3$ and perovskite. Examples of the catalytic activating material include noble metals, such as Pt, Pd and Rh, and base metals, such as Cu, Ni, Cr and Co. The preferred catalyst comprises one in which from 10 to 100 g/ft³ of Pt and/or Pd is loaded on the carrier made of $\gamma\text{-Al}_2O_3$.

Whereas the honeycomb structure employed in the present invention may have any honeycomb configuration, it is desirable that the cell density be held between 6 to 1500 cells/in² (cpi²) (which is 0.9 to 233 cells/cm²) with a wall thickness ranging from 50 to 2000 μm.

The term, "honeycomb structure" is employed in this application to refer to an integral body having a large number of passages partitioned by the cell walls. The passages may have any cross-sectional form (cell shape), e.g., a circular, polygonal or corrugated form.

The present invention will further be illustrated in the following examples which are intended to be illustrative, but not limiting, of this invention.

EXAMPLE

The performance of the catalytic converter at the beginning of the operation of an engine was tested by introducing an exhaust gas of A/F=14.0 (a rich one whose oxidation-reduction index was 0.40) whose temperature was raised at a fixed speed from 100° C. to 420° C. for two minutes and was then maintained at 420° C. for one minute and by measuring the conversion for the exhaust emissions (CO, HC and NOx). At that time, the exhaust gas was respectively introduced at a rate of 0.7 m³/min and 1.0 m³/min. Secondary air was introduced into the catalytic converter at a rate of 50 l/min concurrently with the introduction of the engine exhaust gas. Supply of the secondary air was suspended sixty seconds later.

The catalytic converter employed in Example was comprised of a three-way catalyst (whose rib thickness was 5 mil and whose cell density was 400 cells/in²), having an outer diameter of 90 mmφ and a length of 100 mm, which served as a main monolithic catalyst, and a heater disposed in advance of (upstream of) the three-way catalyst.

The heater employed in the above catalytic converter was manufactured in the manner described below.

Fe powder, Fe-Cr powder (in which Cr was present in a ratio of 50 wt %) and Fe-Al powder (in which Al trol began. For reference, test was also conducted in which the heater was energized for thirty seconds before the exhaust gas was introduced.

Table 2 shows the results of the test.

TABLE 2

| | Test No. | Heater No. | Voltage (V) | Current (A) | Amount of exhaust gas ($m^3$/min) | Power (kw/$m^3$) | Current density (A/$mm^2$) | Introduction of oxygen |
|---|---|---|---|---|---|---|---|---|
| Example for | 1 | 1 | — | — | 0.7 | — | — | No |
| reference | 2 | 1 | — | — | 1.0 | — | — | No |
| Example | 3 | 1 | 22.4 | 145 | 0.7 | 4.6 | 6.0 | Yes |
| of the | 4 | 1 | 22.4 | 145 | 1.0 | 3.2 | 6.0 | Yes |
| present | 5 | 2 | 11.5 | 135 | 0.7 | 2.2 | 10 | Yes |
| invention | 6 | 2 | 11.5 | 135 | 1.0 | 1.6 | 10 | Yes |
| Comparative | 7 | 1 | 11.3 | 75 | 0.7 | 1.2 | 4.3 | Yes |
| example | 8 | 1 | 11.3 | 75 | 1.0 | 0.8 | 4.3 | Yes |
| | 9 | 1 | 22.4 | 145 | 0.7 | 4.6 | 6.0 | No |

| | Test No. | Time required for the heater temperature to be reached | | Heater on-off starting time | Average (%) conversion rate | | |
|---|---|---|---|---|---|---|---|
| | | 300° C. | 400° C. | | CO | HC | NO |
| Example for | 1 | (75 sec)* | (113 sec)* | — | 13 | 11 | 46 |
| reference | 2 | (75 sec)* | (113 sec)* | — | 10 | 8 | 44 |
| Example | 3 | 4.5 | 5.0 | 6.0 | 65 | 50 | 64 |
| of the | 4 | 5.3 | 7.0 | 8.0 | 62 | 57 | 60 |
| present | 5 | 4.2 | 5.0 | 6.0 | 64 | 51 | 65 |
| invention | 6 | 5.2 | 6.8 | 7.5 | 58 | 45 | 38 |
| Comparative | 7 | 14.5 | 24.0 | 35 | 26 | 23 | 52 |
| example | 8 | 20.5 | 35.0 | 55 | 22 | 21 | 48 |
| | 9 | 4.5 | 4.8 | 5.8 | 13 | 11 | 60 |

*Heated by exhaust gas was present in a ratio of 50 wt %), having average particle sizes of 10, 20 and 22 μm, were mixed to prepare a mixture having a composition of Fe-20Cr-5Al (% by weight). The obtained mixture was then blended into an organic binder (methyl cellulose), an antioxidant (oleic acid) and water to produce a readily formable body. The obtained body was then formed into honeycomb bodies having various rib thicknesses and various numbers of square cells shown in Table 1 by extrusion. The formed honeycomb structures were dried, sintered in an atmosphere of $H_2$ at 1300° C., and then subjected to heat treatment at 1000° C. in the atmosphere. The porosity of the obtained honeycomb structures was 22% and the average pore diameter thereof was 5 μm.

As shown in FIG. 1 (in this case, the number of slits was four), the obtained honeycomb structures 10 having an outer diameter of 90 mmφ were processed such that they had various heater lengths shown in Table 1. Thereafter, a predetermined number of slits 12, having a length ranging from 50 to 70 mm, were formed in the individual honeycomb structure 10 formed of partition walls 11. Thereafter, two electrodes 13 were provided on the outer wall of the individual resistance adjusting type heater obtained, and then a heat-resistant inorganic adhesive of zirconia was filled in the outer peripheral portion of each slit 12 to form an insulating portion.

As is clear from Table 2, when the level of power supplied to the heater is low, it takes much time for the heater to be heated to 300° C. or above. In consequence, the degree at which the catalyst is activated is low, and the exhaust gas conversion is also low. Also, in the case where $O_2$ is not introduced, the conversion for CO and HC remains low, even when the heater is heated.

It is also apparent from Table 2 that when the heater is heated at a power level of Examples of the present invention and $O_2$ is introduced, a high conversion for each emission can be achieved.

As will be understood from the foregoing description. in the catalytic converter operating method according to the present invention, the temperature of a heater and that of a main catalyst incorporated in the catalytic converter are raised quickly at the initial stage of the operation of an engine to activate the catalysts and thereby achieve increase in the exhaust gas conversion. The level of power is reduced after the desired temperature has been reached. In consequence, the catalytic converter can be operated efficiently and economically.

What is claimed is:

1. The method of operating a catalytic converter for purifying an exhaust gas from a vehicle, said converter having a honeycomb heater incorporated therein, com-

TABLE 1

| | Thickness of rib (mm) | No. of cells (cpi$^2$) | Length of heater (mm) | No. of slits (pcs) | No. of ribs between slits (pcs) | Heat generating area (mm$^2$) | Overall heat generating length (mm) |
|---|---|---|---|---|---|---|---|
| Heater No. 1 | 0.23 | 300 | 15 | 8 | 5 | 17.3 | 412 |
| Heater No. 2 | 0.15 | 400 | 15 | 5 | 6 | 13.5 | 250 |

A catalyst of $CeO_2$-γ-$Al_2O_3$ in which Pt and Pd were respectively present in an amount of 20 g was placed on each of heater Nos. 1 and 2.

The individual heater was energized using a battery of 24 V or 12 V. Energization started concurrently with the introduction of the engine exhaust gas. When the temperature of the heater reached 450° C., on-off conprising the steps of:

heating a honeycomb heater having a plurality of passages which are defined by partition walls and having a catalyst carried on said partition walls by directly energizing said honeycomb heater at a power level of 1.5 KW or above per unit volume m³ of exhaust gas substantially concurrently with initial operation of an engine;

introducing an oxidizing gas into said honeycomb heater substantially concurrently with said initial operation of said engine, said oxidizing gas introduced such that an oxidation-reduction index is held between 0.7 to 1.1, said oxidation-reduction index being equal to $(O_2 + \frac{1}{2}NO)/(\frac{1}{2}CO + 3/2HC)$, reducing the power level when the temperature of said honeycomb heater exceeds 300° C. or greater; and suspending energization within sixty seconds after exhaust gas is introduced into said catalytic converter.

2. The method of claim 1, wherein said honeycomb heater includes means to interrupt current flow through portions of said honeycomb heater, thereby increasing the resistance of the heater, and is energized by a current density of at least 5 A/mm².

3. The method of claim 1, wherein said heater is energized at a power level of 3 KW or above per unit volume m³ of exhaust gas.

* * * * *

UNITED STATES PATENT AND TRADEMARK OFFICE
CERTIFICATE OF CORRECTION

PATENT NO. : 5,286,460
DATED : February 15, 1994
INVENTOR(S) : Fumio Abe, Takashi Harada and Hioshige Mizuno It is certified that error appears in the above-indentified patent and that said Letters Patent is hereby corrected as shown below:

Column 7, line 1, change "$m^3$" to --$m^3$/min--.

Column 8, line 11, change "$m^3$" to --$m^3$/min--.

Signed and Sealed this

Ninth Day of May, 1995

Attest:

BRUCE LEHMAN

*Attesting Officer*  *Commissioner of Patents and Trademarks*